Dec. 31, 1957  C. R. JELM  2,818,083
METHOD OF INTERNALLY ALLOY COATING TUBULAR BODIES
Filed July 20, 1955
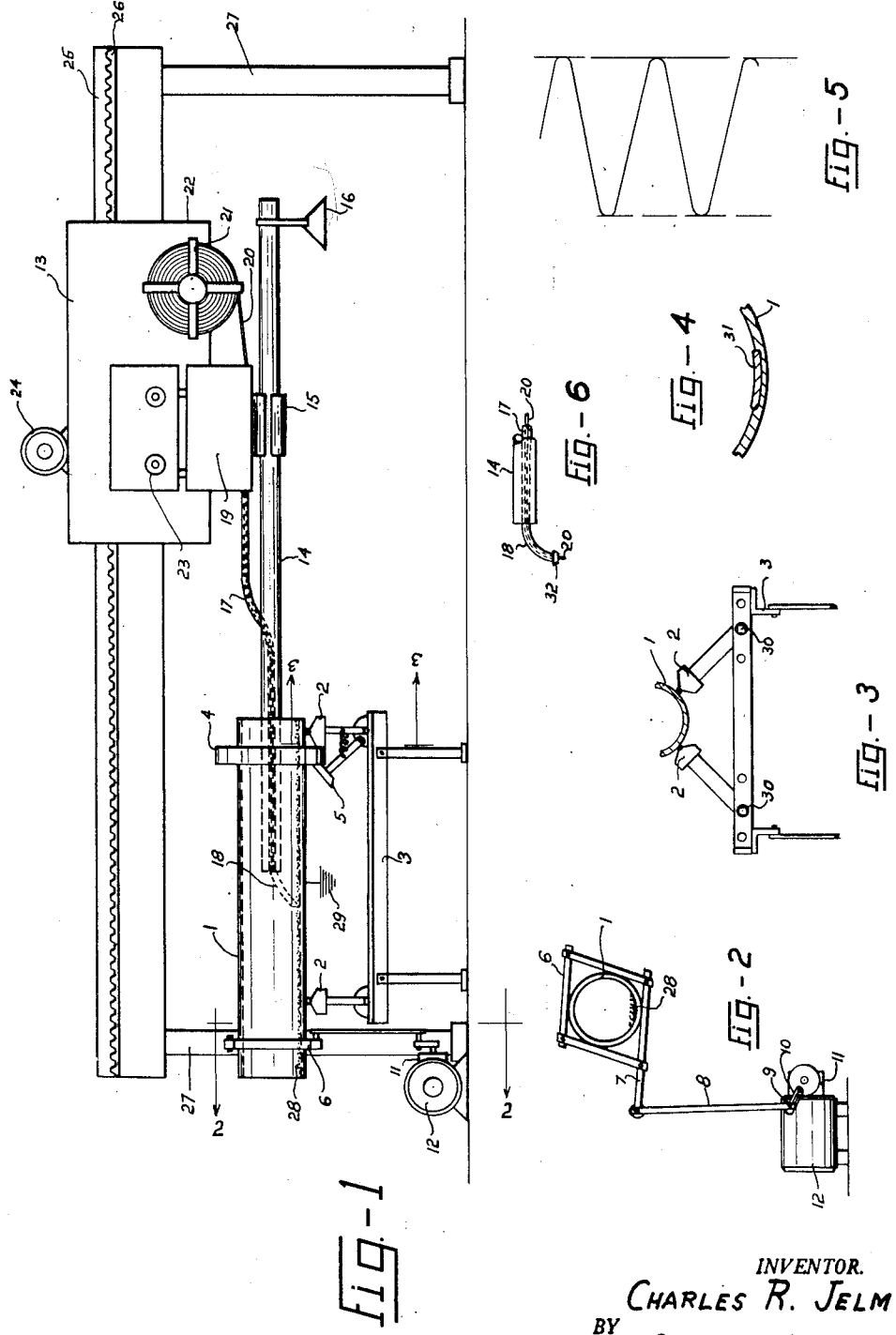
INVENTOR.
CHARLES R. JELM
BY
Robert P. Sturges United States Patent Office 2,818,083
Patented Dec. 31, 1957

2,818,083

METHOD OF INTERNALLY ALLOY COATING TUBULAR BODIES

Charles R. Jelm, Akron, Ohio, assignor to American Alloy Corporation, Cleveland, Ohio, a corporation of Ohio Application July 20, 1955, Serial No. 523,292

7 Claims. (Cl. 138—68)

This invention is an improvement in the coating of metallic tubular bodies with metal and particularly the application of an alloy coating to the inner surface of a tubular wall.

Alloy coating of tubular members is practiced particularly where resistance to abrasion and/or corrosion is required. One application of pipe so surfaced is in the conducting of catalyst in a gas stream as a part of a catalytic cracking operation. Ordinary steel pipe wears out rapidly in the absence of a protective hard metal coating. Although many methods have been tried for providing such a welded abrasive resistant liner, the deposition of molten metal from an arc-welding apparatus to be described appears most practicable.

One method is described in the patent to Jacobus, 2,187,786 dated January 23, 1940. The method here described comprises depositing a spiral bead of weld metal by simultaneous revolution of the pipe and translation thereof with respect to a welding tip at the end of a long probe which is held stationary. As the pipe is revolved and moved longitudinally, a continuous spiral bead is deposited on the inner surface of the pipe. Several problems arise with tubular members of about 2″ to 12″ radius.

In order to cause the least effect upon flow through the pipe where this is a consideration, it is essential that the metallic coating be as smooth as possible. It is desirable that the surface be as smooth as possible where finishing by machining or grinding is required. On a flat piece it is possible to deposit a very smooth surface by electrical heat fusion. In a curved member, e. g., a pipe, tube, or curved shell (pipe segment), it is difficult to obtain a smooth deposit of more than normal weld bead width because of "roll back" when the molten puddle is removed from the flat position. For purposes of this description, "roll back" will be considered as the tendency for a molten pool of metal to flow in response to gravity from the higher to the lower portions of a curved surface.

It is a principal object of this invention, therefore, to provide an improved method of surfacing the concave surface of a tubular member with a metal by metallic arc-welding.

Another object is to provide a means for controlling the character of a wide weld bead deposited on a concave surface.

Still other objects will appear as the description proceeds.

Reference may be had to the annexed drawings wherein:

Fig. 1 is a diagrammatic representation of an apparatus suitable for use in carrying out the method of this invention.

Fig. 2 is an end view of the apparatus taken on the line 2—2 of Fig. 1.

Fig. 3 is a cross-sectional view of the apparatus taken on the line 3—3 of Fig. 1.

Fig. 4 is a fragmentary cross-sectional view of a wide weld bead in place on a concave surface.

Fig. 5 is a representation of a path traced over the concave surface by the arc of the weld tip resulting from the combined oscillatory motion and the lineal motion.

Fig. 6 is a detail of a welding arm tip and head useful in the apparatus shown in Fig. 1.

Reference may be had to Fig. 1, which is a diagrammatic representation of one form of apparatus which may be used in carrying out the method of the present invention. There is provided a pipe 1 supported upon point contact ball bearings 2 attached to a suitable frame 3. At the right hand end of the pipe 1 there is provided a collar 4 secured to the pipe 1 by any suitable means, e. g., tack welding, which collar in combination with the spring loaded idler wheel 5 prevents lateral motion of the pipe.

At the left hand extremity there is provided a suitable means for imparting a controllable oscillatory motion to the work piece 1. Figs. 1 and 2 show a simple jig 6 which is suitable for this purpose. The jig 6 may be expanded or contracted to take various size tubular members or work pieces 1 and is fitted with an extended arm 7 which is pivotally connected with a link 8 which is, in turn, adjustably pivotally connected 9 with an eccentric or crank arm 10 revolved through a variable speed gear box 11 by the motor 12. In place of this mechanism, it will be clear to those skilled in the art of imparting such motion that other means of imparting a controlled oscillatory motion to the work piece 1 may be used, e. g., a cam and a spring loaded link.

Independently mounted with respect to the work piece 1 and its support assembly above described, there is provided a travelling welding assembly 13 with a continuous weld rod feed mechanism connected thereto. More specifically, there is provided a hollow tube 14 held by a suitable clamping means 15 and preferably counterbalanced by a suitable weight 16. The purpose of the tube 14 is to provide a rigid conduit for the wire feeding tube 17 which terminates in a downwardly curved nozzle 18 for directing the welding rod to the work. An automatic feeding mechanism 19 continuously feeds the welding rod 20 from a supply roll 21 mounted upon a suitable back plate 22. Numerous rod feeding mechanisms are available although reference may be had to Patent No. 2,536,294 for a description of one form of such feeding device. The rate of feed of the welding rod is responsive to the arc voltage. There is also provided on the travelling welding assembly means for driving the assembly laterally at a controlled rate per unit time. Thus, there is provided suitable control means 23, which in cooperation with drive motor 24, responsive to a manually selected speed in inches per minute, serves to move the travelling welding assembly in either direction along the beam 25 which is fitted with a suitable rack 26. The beam may be supported from the ceiling or, as shown, upon suitable posts 27 from the floor.

Fig. 2 has been described above as an end view of one assembly for imparting a controlled oscillatory motion to the work piece 1. There is also shown in Fig. 2 the granular flux 28 which desirably covers the arc during the welding operation.

In accordance with customary welding procedure, the work piece is grounded as shown at 29 in Fig. 1.

Fig. 3 is a cross-sectional view taken on the line 3—3 of Fig. 1 and merely shows one means of supporting the work piece 1 upon point contact ball bearings 2 mounted in the frame 3 by suitable means such as bolts 30 which permit variation of the angle of said bearings to accept various sized work pieces 1.

Fig. 4 shows a concave section of a work piece 1 having a bead of weld deposited metal 31 shown in place.

Fig. 5 is a diagrammatic representation of the path traced as a result of the combined relative motion of the longitudinally moved welding tip 18 and the oscillatory motion imparted to the work piece 1. This will be recognized as a simple harmonic motion.

Fig. 6 is a more detailed illustration of the welding head. There is shown the extremity of the tubular support arm 14 carrying the wire feeding tube 17 with the wire 20 shown in place. The nozzle 18 emerging from the extremity of the tube 14 terminates in a tip 32 through which the wire 20 protrudes.

Briefly stated, coating of the interior of a concave surface is achieved in accordance with the present invention by depositing a plurality of longitudinal weld beads throughout the entire length of such concave surface until complete coverage has been secured. In depositing the longitudinal beads, a number of parameters are taken into account as will be more fully discussed below. The sequence of deposition of the longitudinal beads is preferably to deposit the first two beads about 180° apart, the next two in the remaining two quadrants about 90° removed from the first two and then translating one bead width from the first bead deposited and repeating the cycle in the order first laid down. Any uniform pattern of deposition of the longitudinal bead may be employed which will give a uniform heat distribution. This process is repeated until the entire surface is covered by an electrically fused metal. The purpose of this procedure is to minimize warping of the concave surface. More than one layer can be deposited as may be desired.

Although prior reference has been had to the coating of tubular members, e. g., iron pipe, it will be understood that cylindrical surfaces which are not closed, e. g., cylindrical segments, may also be coated by this process.

Generally speaking, the process of the present invention comprises oscillating a hollow cylindrical member or segment about its axis, and simultaneously longitudinally applying a fusion welded bead while relatively moving the weld rod and said cylindrical member axially. Although departures from these limits may be made, from actual practice it has been found that a frequency from about 10 to about 50 cycles per minute through an arc of from about ½ inch to 3 inches, and a longitudinal or axial travel rate of 2 to 20 inches per minute represent the practical limits of operation. These limits have been found satisfactory in the coating of cylindrical members having diameters ranging from about 4 to about 24 inches. The length of the cylindrical member so treated is limited only by the size of the apparatus although it has been found that regular mill lengths of iron pipe of the aforesaid diameters, i. e., up to 20 feet in length or more, may be coated conveniently by this process.

With respect to these limits, reasonable application of the same is to be assumed, for one can envision ridiculous results when using, for example, 50 cycles per minute on a 3 inch bead for a 24 inch diameter pipe with an axial travel of 20 inches per minute. These are all maximums and in this particular instance it might be expected that although the pipe may be successfully coated, the character of the bead so deposited may be adversely affected because of the injudicious employment of extremities of limits of but a few of the parameters which may influence the character of the bead.

Metal deposited by means of an electric arc remains molten for an appreciable period of time and if it is being applied to a curved surface of sufficiently small diameter, the metal will flow or "roll back" upon itself before solidification occurs and will, therefore, leave a rough and irregular bead. The irregularities caused by uncontrolled roll back are sufficient to disturb the flow characteristics of materials carried by pipe so coated.

The essential feature in the present system is the use made of inertia of the pool of molten metal to aid in its distribution evenly or in a controlled manner over the width of the bead being deposited. There are two components of motion involved, namely, oscillation of the work and lineal movement of the weld tip with respect to the work, or simple harmonic motion. The peripheral speed in the oscillatory motion rises from zero to a maximum, decreases to zero and then rises to a maximum again on the reverse portion of the stroke. Practical average peripheral speeds have been found to be within the range of from about 10 to about 200 inches per minute. The effect of this acceleration and deceleration is to control the distribution of the molten pool of metal. Actual operational tests have shown that if the peripheral speed is too slow, and the diameter small enough (4 to 24 inches), then there is a tendency for the molten weld metal to roll back which causes the bead to pile up in the central portion and to be thin and "washed out" at the outer extremities. If the oscillation or frequency is too great, then there is a tendency to throw the molten metal to the outer edges of the bead, causing a build-up at the outer edges and a depression in the central portion of the bead. Where the oscillation rate or frequency is proper for the given conditions of pipe diameter, arc temperature, ambient temperature, presence or absence of a welding flux, etc., then the bead deposited will have a substantially uniform thickness throughout its width.

Another feature of the present invention is in the combination of two separate components of motion which combine to produce a harmonic motion by the oscillation of work and the lineal motion of the weld tip. In other words, the path traced by the welding rod over the concave surface is substantially sinusoidal, except for the fact that it is traced on a curved surface. Different camming or linking of the drive mechanism or variations in the rate of lineal travel of the welding tip will, of course, alter the character of the harmonic motion and in certain instances, this may be found desirable, e. g., where an irregular surface is being coated.

There are available on the market welding tips which deposit a longitudinal bead upon flat work wherein the welding head oscillates and the welding assembly moves in a longitudinal direction, thereby depositing a longitudinal harmonic bead. The work remains stationary. The present invention is to be distinguished from the prior art in oscillating the work piece itself and maintaining the welding head stationary with respect to transverse movement other than in a longitudinal direction relative to the work piece.

In small diameter pipe (4–24" tubular sections) use of the oscillating head and stationary work piece will cause a roll back to the center of the bead because no lateral kinetic energy is supplied to the molten pool to effect an even distribution. Oscillation of the work piece imparts an oscillatory motion to the molten metal which makes possible control, to a degree, of the character of the bead which is deposited. Where the work piece remains stationary, however, oscillatory motion of the weld head does not impart a motion to the molten pool of electrically fused metal.

As general guides to selecting the proper operating conditions, it may be pointed out that the larger the diameter of the curved surface being coated, the slower the frequency required to obtain a bead of substantially uniform thickness. While 40 cycles per minute is a little high in the case of a 12 inch pipe in which a 1¾ inch bead is being deposited, 40 cycles per minute is quite satisfactory in the case of a 10 inch pipe where a 1¼ inch bead is being deposited. 20 cycles per minute is slow for a 1¾ inch bead in a 12 inch pipe but may be satisfactory for a 1¾ inch bead in a 24 inch pipe. Best results are secured at a frequency of 35 oscillations per minute in depositing a 1¾ inch bead in a pipe from 10 to 12 inches in diameter.

The relative linear motion of the work and the welding head is determined by the "fill-in" or "build-up" desired. If the linear rate is too high, then it is possible that the amount of "fill-in" will be defective. If the linear rate is too slow, then the bead will build up to a greater thickness than desired. In general, a lineal speed of from 2 to 20 inches per minute is satisfactory, consideration being given, of course, to the width of the bead and the rate of oscillation and build-up desired.

It becomes convenient to illustrate this process by giving a specific example of working conditions for coating the inside of an ordinary 12" steel pipe. The welding rod is of 7/64 inch diameter, hollow, containing flux and alloy in the interior thereof and is fed from a reel. The analysis of the rod may be any which is desired, in this case that which will produce 3 to 3.5% carbon, 18 to 22% chrome and the balance iron, as deposited. The welding amperage is 250 amps. D. C. reverse polarity, the oscillation rate 35 cycles per minute, and the lineal travel 8 inches per minute. A deep flux of the type described in U. S. Pat. No. 2,043,960 to Jones may be used. A specific example of this is Linde's grade 50 flux, 8 x 48 mesh. The arc voltage is 30 to 40 volts. The width of oscillation is 1.75 inches. These conditions will produce a smooth approximately 1/8" weld deposit of the aforementioned analysis.

Other alloys may be employed depending upon the application of the product which might require specific resistance to corrosion or different types of wear. Examples of such coatings include copper, brasses, stainless steels, fusible ceramics and metallo-ceramics, etc. A hollow alloy type rod does not necessarily have to be employed, but solid wires of suitable composition to obtain desired results may be used. It may also be found desirable to use various alloy fluxes which are commercially available in conjunction with an alloyed or unalloyed rod to produce the desired deposit.

Although various tips may be used to direct the welding rod to the work, the distance between the end of the tip and the work is a factor to be considered. The purpose of the tip is to prevent play in the rod. If the tip is too close to the work, it will melt off. If it is too far away from the work, then there will be play in the rod which will result in an imperfect bead being laid down. In the present specific example, the tip-to-work distance was 1.25 inches although this will vary depending upon the nature of the tip, the curvature thereof, etc.

It has also been noted that if the welding tip or the arc is to the right or the left of the center of the pipe being deposited, there will be a tendency to build up on the opposite side of the bead. Thus, for best results, it is desirable that the arc be located as close to the center as practicable.

In commencing the coating operation, the pipe is first filled with welding flux to a depth of from about 1/2 to about 1 inch with the deep flux. The welding head assembly is advanced into the pipe until the weld rod touches the open end of the pipe. Referring to Fig. 1, the welding assembly is advanced to the left until the tip 13 directs the weld rod to the left hand edge of the work piece 1. Oscillation is begun by starting the motor 12 at the above rate, the current turned on to initiate the arc, and the lineal travel motor control 23 activated at the pre-selected lineal travel. The first bead is thus deposited throughout the entire length of the pipe at a width of 1 3/4 inches. Examination of the bead so deposited will reveal that it is quite smooth, having an average thickness of 90 thousandths on top of the base metal and an average thickness of about 60 thousandths of an inch into the steel pipe or a total thickness of the bead of 150 thousandths. Following the deposition of the first bead, the clamping mechanism 6 is loosened and the pipe rotated 180°, and the sequence of operations described above repeated to deposit the second bead.

At the conclusion of the deposition of the second bead the clamping mechanism 6 is again loosened, and the pipe rotated 90° and re-clamped. The bead casting operation is again repeated to produce bead No. 3. At the conclusion of this operation, bead No. 4 is cast by rotating the pipe in the manner aforesaid 180° from bead No. 3. The beads are, as shown in Fig. 1, deposited at the lowermost portion of the inner surface of the pipe.

Bead No. 5 is deposited adjacent bead No. 1 in the manner aforesaid. Bead No. 6 is deposited 180° from bead No. 5 and adjacent bead No. 2. In like manner, the successive beads are deposited until the entire inner surface of the pipe has been coated with a composition corresponding to the alloy above described.

The finished product is a 12" pipe having an inner coating 150 thousandths thick of the aforementioned analysis, and although the individual beads are discernable, nevertheless the inner surface is surprisingly smooth for an arc-deposited coating. The coated pipe so produced is especially useful in apparatus where abrasion is a serious problem, e. g., the handling of catalyst materials in an air stream.

As indicated above, the process of this invention is applicable to hollow cylinders as well as to portions of a hollow cylinder. Thus, if it is desirable to coat a segment of a pipe, e. g., a 90° segment, the process of the present invention is adaptable thereto, for such 90° segments can then be welded together to produce a tubular member.

While the foregoing discussion has been directed primarily to flux shielded arc welding, the process of this invention is useful with other known methods of depositing weld beads, e. g., inert gas shielded arc, open metallic arc, gas fusion, etc.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for coating the inner surface of a metallic cylindrical body with a fused metal deposit which comprises oscillating said cylindrical body about its axis at an average peripheral speed of from about 10 to about 200 inches per minute and simultaneously applying a longitudinal fusion welded bead while relatively moving the weld rod end and said cylindrical body axially.

2. A process for coating the inner surface of a metallic cylindrical body with a fused metal deposit which comprises oscillating said cylindrical body about its axis at an average peripheral speed of from about 10 to about 200 inches per minute and simultaneously applying a longitudinal fusion welded bead while relatively moving the weld rod end and said cylindrical body axially, said bead having a width of from about 1/2" to about 3".

3. A process for alloy coating the inner surface of a cylindrical iron pipe having a diameter of from about 4 to about 24 inches with an electrically fused metal which comprises oscillating said pipe about its axis at a frequency of from about 10 to about 50 cycles per minute through an arc of from about 1/2 inch to about 3 inches and simultaneously applying as a longitudinal strip a fusion welded bead while relatively moving the weld rod end and said pipe in an axial direction at a rate of from about 2 inches to about 20 inches per minute.

4. A process for alloy coating the inner surface of a cylindrical iron pipe having a diameter of from about 4 to about 24 inches with a weld deposited metal which comprises applying a plurality of longitudinal strips of such weld metal, each strip being deposited at the lowermost portion of said pipe while oscillating said pipe about its axis at a frequency of from about 10 to about 50 cycles per minute through an arc of from about 1/2 inch to about 3 inches and relatively moving the weld rod end and said pipe in an axial direction at a rate of from about 2 inches per minute to about 20 inches per minute, and repeating the application of such strips after rotating the pipe between applications of said longitudinal strips to expose an uncovered portion as the lowermost portion of said pipe, until the entire inner surface is coated.

5. A process for alloy coating the inner surface of a tubular iron pipe having a diameter of from about 4 inches to about 24 inches with a weld deposited alloy which comprises applying a plurality of longitudinal strips of such weld metal sufficient to coat the entire inner surface, each of such strips being deposited at the lowermost portion of said pipe while oscillating said pipe about its axis at a frequency of from about 10 to about 50 cycles per minute through an arc of from about ½ inch to about 3 inches and moving the weld rod from one open end of said pipe to the other at a lineal rate of from about 2 inches to about 20 inches per minute, the order of successive deposition of such weld beads being substantially:

First strip 0°
Second strip 180°
Third strip 90° or 270°
Fourth strip 270° or 90°
Fifth strip—adjacent first strip
Sixth strip—adjacent second strip
Seventh strip—adjacent third or fourth
Eighth strip—adjacent fourth or third and so forth until the entire inner surface is coated, each of the said strips being applied after rotating the pipe to position the point of application as the lowermost portion of the pipe.

6. A process for alloy coating the inner surface of a tubular iron pipe having a diameter of from about 4 to about 24 inches with a high chrome weld deposited alloy which comprises applying under a deep flux a plurality of longitudinal strips of such weld alloy sufficient to coat the entire inner surface, each strip being deposited at the lowermost portion of said pipe under a flux of sufficient depth to cover the arc while oscillating said pipe about its axis at a frequency of about 30 to 40 cycles per minute through an arc of about 1¼ inches to 2¾ inches, and relatively moving in an axial direction the weld rod end from one end of said pipe to the other at a lineal rate of about 2 to 20 inches per minute, successive depositions being spaced apart by rotating the pipe between applications of successive deposits to expose an uncovered spaced apart portion as the lowermost portion of the pipe.

7. The product produced by the process of claim 6.

References Cited in the file of this patent
UNITED STATES PATENTS

| | | |
|---|---|---|
| 996,406 | Hall | June 27, 1911 |
| 1,481,071 | Sindelar | Jan. 15, 1924 |
| 2,187,786 | Jacobus | Jan. 23, 1940 |
| 2,267,296 | Bennewitz | Dec. 23, 1941 |
| 2,427,350 | Carpenter | Sept. 16, 1947 |
| 2,441,748 | Black | May 18, 1948 |